United States Patent [19]
Jaeger et al.

[11] Patent Number: 5,389,245
[45] Date of Patent: Feb. 14, 1995

[54] VAPOR SEPARATING UNIT FOR A FUEL SYSTEM

[75] Inventors: Matthew W. Jaeger, Fond du Lac, Wis.; Brian R. White, Stillwater, Okla.; Steven M. Lippincott, Stillwater, Okla.; Jerry M. Stoll, Jr., Stillwater, Okla.; Yasuaki Ogishi, Greendale, Wis.; Ken-Ichi Nomura, Yokohama, Japan

[73] Assignee: Brunswick Corporation, Lake Forest, Ill.

[21] Appl. No.: 104,772

[22] Filed: Aug. 10, 1993

[51] Int. Cl.6 .............................................. B01D 35/01
[52] U.S. Cl. ..................... 210/129; 210/167; 210/188; 210/258; 210/349; 210/416.4; 123/497; 123/506; 123/514; 123/516
[58] Field of Search ............... 123/495, 497, 505, 506, 123/509, 514, 516, 195 A, DIG. 2; 210/103, 105, 121, 123, 128, 129, 153, 171, 188, 194, 241, 252, 258, 259, 349, 416.1, 416.4, 418, 436, 455, 472, DIG. 6, 167

[56] References Cited

U.S. PATENT DOCUMENTS

| | | | |
|---|---|---|---|
| 1,249,939 | 12/1917 | Falwell | 210/416.4 |
| 2,146,397 | 2/1939 | Kommer | 210/416.4 |
| 2,352,958 | 7/1944 | Lauer et al. | 210/416.4 |
| 3,165,469 | 1/1965 | Bruns et al. | 210/416.4 |
| 4,637,351 | 1/1987 | Pakula | 123/497 |
| 4,694,857 | 9/1987 | Harris | . |
| 4,956,081 | 9/1990 | Hodgkins et al. | 210/136 |
| 5,127,555 | 7/1992 | Mittermaier | 210/234 |
| 5,231,967 | 8/1993 | Baltz et al. | 123/497 |

FOREIGN PATENT DOCUMENTS

86/00242 1/1986 WIPO .................. 210/416.4

Primary Examiner—Robert A. Dawson
Assistant Examiner—W. L. Walker
Attorney, Agent, or Firm—Andrus, Sceales, Starke & Sawall

[57] ABSTRACT

A vapor separating unit for a fuel system and having particular application to a fuel system for a marine engine. The vapor separating unit includes a closed tank having a fuel inlet through which fuel is fed to the tank by a diaphragm pump. The liquid level in the tank is controlled by a float-operated valve. An electric pump is located within the vapor separating tank and has an inlet disposed in the tank and an outlet connected to a fuel rail assembly of the engine. Excess fuel from the fuel rail assembly is conducted back to the upper end of the vapor separator tank. A vapor venting mechanism is incorporated in the tank to vent vapor from the tank.

19 Claims, 3 Drawing Sheets

VAPOR SEPARATING UNIT FOR A FUEL SYSTEM

BACKGROUND OF THE INVENTION

Vapor separating units are incorporated with internal combustion engines to remove vapor from the fuel supply system. The typical separating unit is located in the fuel line between the fuel tank and the engine, and includes a tank or container into which the fuel is pumped. The liquid level is maintained within the vapor separating tank by a float or other liquid level control mechanism. With fuel injection engines, the fuel is pumped from the vapor separating tank to a fuel rail assembly where the fuel is fed through fuel injectors to the cylinders of the engine. With this system, excess fuel not fed through the fuel injectors is returned either to the fuel tank or in the case of marine engines, the excess fuel is returned to the vapor separating tank.

The fuel rail assembly includes a pressure regulator and as the fuel passes through the regulator, the pressure is reduced. This decrease in pressure can cause vaporization of the fuel. To vent the vapor from the fuel being returned to the vapor separating tank, a vent mechanism is incorporated with the tank to vent the vapor when the vapor pressure exceeds a predetermined value.

Some fuel supply systems utilize a single pump to pump the fuel from the fuel tank through the vapor separating tank to the engine while other feed systems incorporate a pair of pumps, including a mechanical diaphragm or electric pump to feed the fuel from the fuel tank to the vapor separating tank and an electric pump to feed the fuel from the separating tank to the engine.

SUMMARY OF THE INVENTION

The invention is directed to an improved vapor separating unit for an internal combustion engine and has particular application to fuel injected marine engines. The vapor separating unit of the invention includes a separating tank and fuel is supplied from a fuel tank to an inlet in the separating tank by a diaphragm electric pump. The flow of fuel into the separating tank is controlled by a valve mechanism in the inlet which in turn is operated by a float control to thereby maintain a predetermined liquid level within the separating tank.

Located within the separating tank is an electric pump and the inlet to the electric pump is positioned in a well or depression in the tank, while the outlet from the electric pump is connected via a conduit or fuel line to the fuel rail assembly of the engine where the fuel is fed through a series of fuel injectors into the cylinders or intake manifold of the engine.

Excess fuel not fed through the fuel injectors is returned from the fuel rail assembly through a return conduit or line to the upper end of the vapor separating tank. The returning fuel is fed into a section of the separating tank in a tangential manner, causing the fuel to swirl, thus enhancing the separation of the liquid fuel from vapor.

The vapor, which can include both fuel vapor and air, collects in the head space of the tank and the invention also includes a novel vapor venting mechanism. The venting mechanism includes a chamber which is located within the upper end of the vapor separating tank. A diaphragm extends across the chamber and divides the chamber into a first and second chamber section. A passage connects either the inlet fuel line or the atmosphere with the first chamber section while the second chamber section is exposed to the vapor in the head space of the tank. Because the first chamber is connected to the inlet fuel line and not to the atmosphere, a failure of the diaphragm will not cause a massive fuel leak. Connected to the second chamber section is a vent line which is preferably connected to an intake runner of the engine and the vent line is adapted to be closed by a valve that is carried by the diaphragm. The valve is biased to an open condition by a spring or other resilient member which is interconnected between the diaphragm and a fixed location on the separating tank.

With this venting mechanism, when the engine is not operating, the force of the spring will maintain the vent valve in the open position to thereby vent vapor from the head space of the separating tank. When the engine is operated, the diaphragm pump will correspondingly be operated to increase the pressure in the first chamber section to overcome the force of the spring and move the vent valve to the closed position. If the vapor pressure increases during operation of the engine, as can occur if the engine idles for long periods, the increased vapor pressure acting in conjunction with the spring force will overcome the fuel pressure acting on the opposite side of the diaphragm to flex the diaphragm and move the vent valve to the open position.

When the engine operation is terminated, the diaphragm pump will cease operation, thereby reducing the fuel pressure in the first chamber section and enabling the force of the spring to move the vent valve to the open position. Thus, the vapor separating tank will automatically be vented on termination of operation of the engine.

As the electric pump is located within the vapor separating tank rather than outside of the tank, sealed connections or fittings which would normally be required with an external pump are eliminated, thus reducing the potential for leakage. Further, by locating the pump within the vapor separating tank in contact with the liquid fuel, the pump will be cooled by the fuel.

The invention also includes a novel mounting mechanism for mounting the vapor separating tank to the plenum and manifold of the engine. The separating tank includes a pair of downwardly extending legs which are connected to upwardly extending lugs on the manifold through use of a single bolt. In addition, the upper end of the separating tank is formed with an outwardly extending projection which is received within an inverted, U-shaped recess in the plenum. The engagement of the projection with the U-shaped recess prevents rotation of the separating tank about the connection to the manifold, and yet enables the plenum to be lifted from the separating tank without disconnecting the separating tank from the manifold. As a further feature, the projection which extends outwardly from the separating tank, as well as the downward legs, can be covered by a resilient rubber-like layer which will tend to isolate the separation tank from heat and vibration from the engine. The U-shape recess allows removal of the plenum without removing the vapor separating tank.

As a further aspect of the invention, the separating tank includes a mechanism for mounting a fuel filter on the outer surface of the tank. The fuel filter normally includes an upper and lower fitting which connect the inlet and outlet of the filter to fuel lines. With the invention, the filter is clamped to the outer surface of the separating tank and due to limited access at the bottom of the filter, the separating tank, at a location beneath the filter, is provided with an outwardly extending projection having a pair of superimposed, open-ended notches. One of the notches is partially cylindrical to receive the fuel line at the bottom of the filter while the other notch is partially polygonal and is adapted to receive the nut on the fuel line. With this construction, the fuel line and fuel line nut are inserted within the notches, and the nut is held against rotation so that the filter can then be rotated relative to the nut to connect the fuel line. The upper fuel line fitting can then be attached to the upper end of the filter container.

To aid in priming the engine, the upper end of the separating tank can be provided with a priming port which is normally enclosed by a removable plug. At start-up of a new engine or in other situations where fuel may have been drained from the supply system, fuel can be fed through the priming port into the separator tank to aid in priming the engine.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
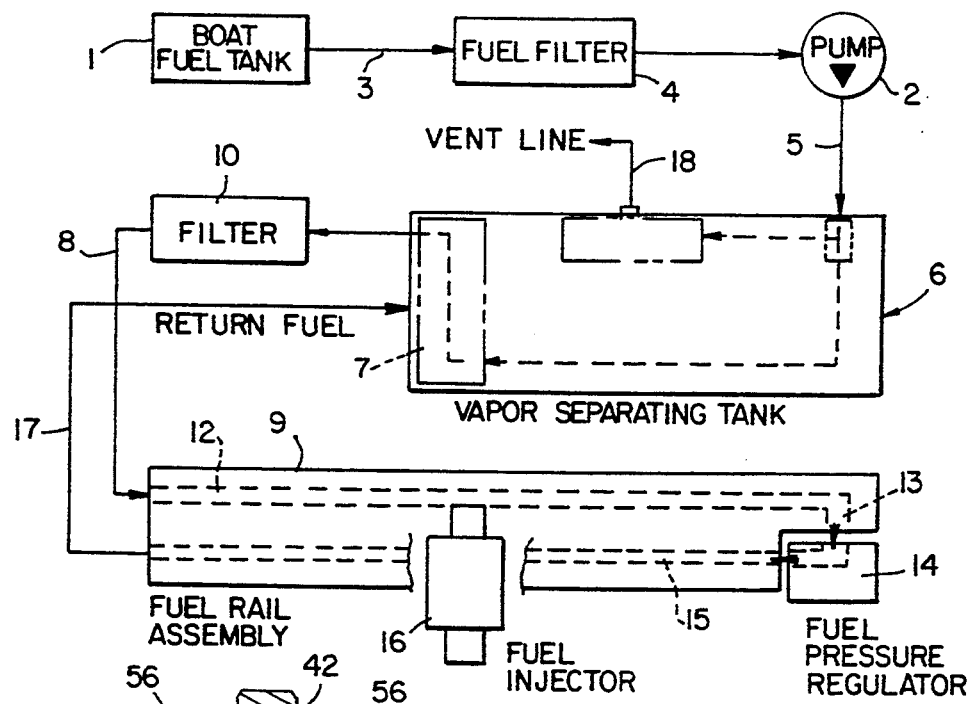
FIG. 1 is a diagrammatic view of a fuel supply system for a fuel injected marine engine incorporating the vapor separating tank of the invention.

FIG. 1 schematically shows a fuel supply system for a fuel injected marine engine. The fuel supply system includes a fuel tank 1 mounted on the boat and the fuel is drawn from the tank by a pump 2 through line 3. A water separating fuel filter 4 is located in line 3.

Pump 2 is preferably a diaphragm pump, although an electric or mechanical pump could also be used, and operates at relatively low pressure in the range of about to 8 psi.

The discharge side of pump 2 is connected through fuel line 5 to a vapor separating tank 6 and fuel contained within tank 6 is pumped by an electric pump 7 contained within the tank through line 8 to a fuel rail assembly 9 and a fuel filter 10 is located in the line 8.

As seen in FIG. 1, the fuel rail assembly 9 includes an inlet bore or passage 12 and the fuel is fed to the passage 12 from line 8. The opposite end of the passage 12 is connected via a opening 13 to a pressure regulator assembly 14 and the fuel flows from the pressure regulator through the bore or passage 15. A series of fuel injectors 16 communicate with the bore 12 and serve to supply fuel to the cylinders of the engine in a conventional manner. The opposite end of the passage 15 is connected via a return line 17 to the upper end of the vapor separating tank 6 so that any unused fuel which is not fed through the injectors 16 will be returned to the tank 6.

Connected to the upper end of tank 6 is a vent line 18 which serves to vent vapor from the tank in a manner as will be hereinafter described.

Figure 2:
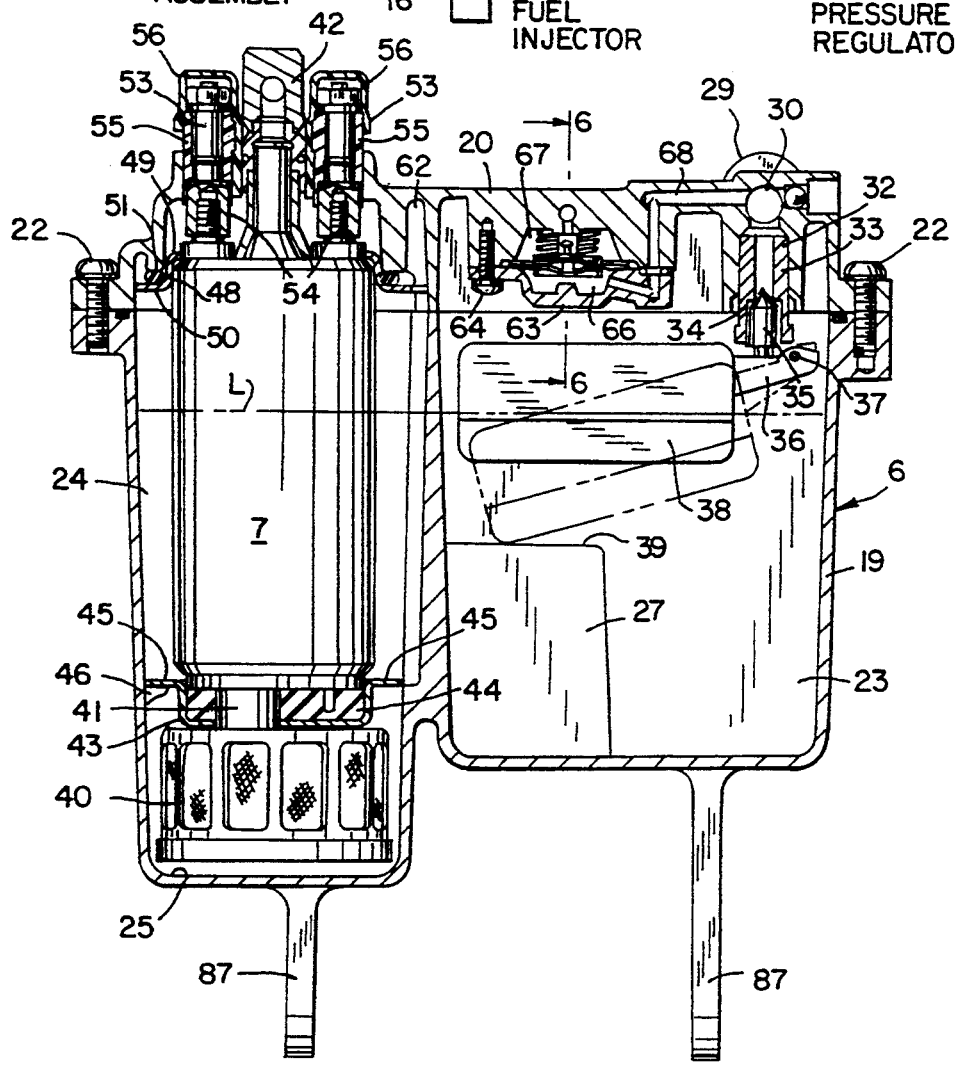
FIG. 2 is a vertical section of the vapor separating tank.

As illustrated in FIG. 2, vapor separating tank 6 includes a body 19 having an open end which is enclosed by a sealed cover or lid 20. A series of screws 22 serve to connect cover 20 to projections on the upper edge of body 19.

Body 19 defines a generally rectangular section or reservoir 23 and a connecting generally cylindrical section or pump chamber 24. As best seen in FIG. 2, the lower end of the pump chamber 24 extends downwardly beyond the lower end of reservoir 23 to provide a well or depression 25.

Figure 7:
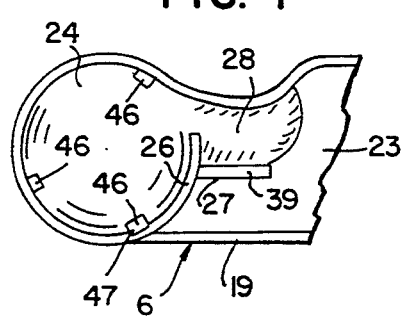
FIG. 7 is a fragmentary top view of the body of the separating tank with the pump removed.

As shown in FIG. 7, the pump chamber 24 is separated from reservoir 23 by a generally curved internal wall 26. The free end of wall 26 terminates short of the body 19 to provide a gap that establishes communication between the reservoir 23 and pump chamber 24. In addition, a generally straight wall 27 extends outwardly from the curved internal wall 26 into the reservoir 23 and the upper edge of the wall 27 provides a stop for a float as will be hereinafter described.

An area of the bottom surface of reservoir 23 is depressed, as indicated by 28, to provide a sloping trough that connects the reservoir 23 with the pumping chamber 24, thereby facilitating flow of the liquid fuel from the reservoir to the lower end of the pumping chamber. The sloping trough 28 insures that when the engine is running at low fuel, all of the fuel will flow from the reservoir 23 into the well 25, where it can be pumped to the engine, thus providing at least a short increase in running time.

The liquid fuel being supplied by pump 2 through line 5 enters an inlet fitting 29 mounted in cover 20. Inlet fitting 29 includes a horizontal passage 30 that communicates with fuel line 5 and a vertical passage 32 which extends downwardly from passage 30 and communicates with the interior of tank 6. As best shown in FIG. 2, a sleeve 33 is mounted in the vertical passage 32 and defines a valve seat 34.

Valve seat 34 is adapted to be engaged by a needle valve 35 which is mounted on an arm 36. As illustrated in FIG. 2, one end of the arm is mounted for pivotal movement on a horizontal shaft or pin 37, while a float 38 is mounted on the opposite end of arm 36. Movement of the float 38 will open and close the valve 35 to thereby control the flow of fuel into the tank 6. As shown in FIG. 2, the fuel level when the float valve is closed, is indicated by L.

As previously noted, the upper edge 39 of wall 27 provides a stop to limit the downward movement of float 38.

Electric pump 7 is located in the pump chamber 24 and a screened inlet 40 is mounted on the inlet tube 41 of the pump while a discharge fitting 42 is connected to the outlet at the upper end of the pump and serves to discharge the fuel through the line 8 to the fuel rail assembly.

Pump 7 is mounted in the pump chamber 24 in a manner such that the screened inlet 40 is spaced above the surface of well 25. In this regard, a cup-shaped support 43 is mounted between the lower end of the pump and the inlet 40 and a resilient pad 44 is located between the support 43 and the lower surface of the pump. The peripheral edge of support 43 is provided with a plurality of outwardly projecting tabs 45 which are adapted to rest on ledges 46 formed on the inner surface of body 19. A longitudinal guide channel 47 is formed in the wall of body 19 and extends upwardly from one of the ledges 46 as shown in FIG. 7. Engagement of the tabs 45 with the ledges 46 will space the lower end of the inlet 40 above the well 25 as shown in FIG. 2.

An upper ring 48 is positioned around the upper end of pump 7 and has an inwardly extending upper flange 49 which engages the upper surface of the pump. Ring 48 is also formed with an outwardly extending lower flange 50 and the lower flange is sealed to cover 20 by an O-ring 51.

To provide the electrical connections to pump 7, a pair of metal posts 53 extend upwardly from the terminals 54 of the pump through suitable openings in cover 20 and an insulating sleeve 55 is mounted around each post 53. An insulating cap 56 is connected to the upper end of each sleeve 55. Suitable seals, not shown, are located between the posts 53 and the surrounding sleeves 55 and between the sleeves 55 and cover 20.

Figure 3:
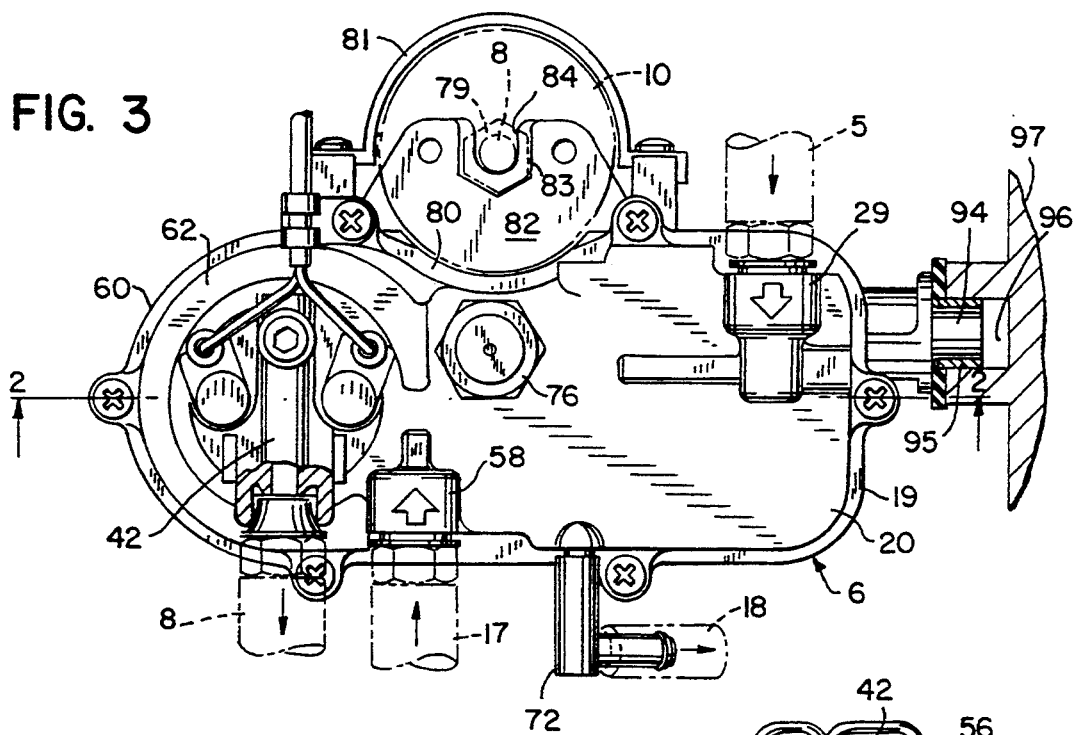
FIG. 3 is top view of the separating tank.

The return line 17 which returns excess fuel from the fuel rail assembly 9 is connected to a fitting 58 on the cover 20. Fitting 58 is provided with an axial passage which is positioned generally tangentially with respect to the pump chamber 24, as shown in FIG. 3. The portion 60 of cover 20 enclosing pump chamber 24 is formed with a generally helical surface or ramp 62 which extends slightly less than 360°. The returning fuel entering the fitting 58 will flow in a swirling path along the helical ramp 62 causing the liquid to be thrown outwardly by centripital force and effecting a more effective separation of the liquid fuel from vapor. As the fuel flows through the pressure regulator 14 associated with the fuel rail assembly 9, the pressure is substantially reduced and the reduced pressure can cause vaporization of the fuel. Thus the fuel being returned to the tank 6 through line 17 will normally include vapor which can be both fuel vapor as well as air that can come from servicing the fuel system. The liquid fuel, as well as the vapor, pass through the gap between the periphery of ring 48 and section 60 of cover 20, with the liquid then flowing downwardly along the outer surface of pump 7 to cool the pump and being collected in the lower end of the pump chamber 24 as well as in reservoir 23, while the vapor will be collected in the head space of the tank above the liquid level L.

Figure 6:
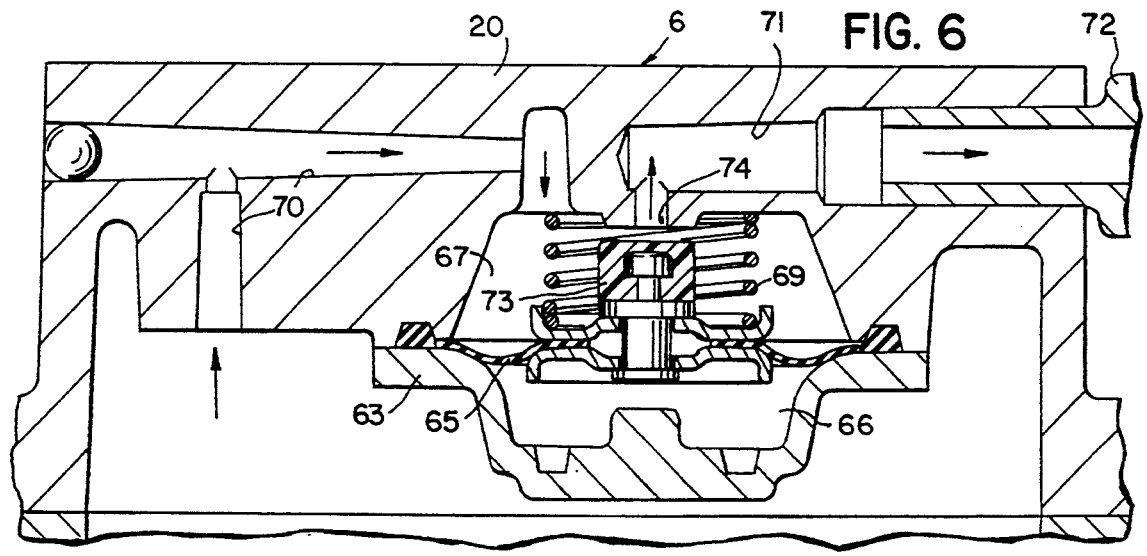
FIG. 6 is a section taken along line 6—6 of FIG. 2 and showing the vapor venting mechanism.

The invention includes a novel vapor venting mechanism which is best illustrated in FIG. 6. The vapor venting mechanism includes a cup shaped member 63 which is attached by screws 64 to the under side of cover 20. A flexible, pressure responsive member, such as a diaphragm 65, is clamped between the cup shaped member 63 and cover 20 and divides the chamber between these members into a lower chamber 66 and an upper chamber 67. As best shown in FIG. 2, a passage 68 connects the fuel inlet passage 30 with the lower chamber 66 so that the pressure of the fuel in line 5 is applied through the lower chamber 66 to the lower surface of diaphragm 65. Alternately, passage 68 can connect chamber 66 with the atmosphere.

A resilient member, such as coil spring 69, is interposed between cover 20 and diaphragm 65 and serves to bias the diaphragm downwardly to the position shown in FIGS. 2 and 6.

Connected to the upper chamber 67 is a passage 70 which provides communication between the upper chamber 67 and the head space of tank 6. In addition, one end of a vent passage 71 also communicates with upper chamber 67 and the opposite end of the vent passage receives a connector 72 which is preferably connected via line 18 to the intake manifold of the engine.

Flow through the vent passage 71 is controlled by a valve 73 that is mounted on diaphragm 65 and is adapted to engage valve seat 74.

When the engine is not operating, pump 2 will likewise not be operating so that there will be no pressure in line 5, passage 68 and the lower chamber 66. Thus the force of spring 69 will urge the valve 73 to an open position as shown in FIG. 2.

When the engine is started and the pump 2 is operated, pressure will be applied through line 5 and passage 68 to the lower chamber 66 and this pressure will overcome the force of the spring 69, thereby moving valve 73 to the closed position, to close the vent passage 71. In practice, pump 2 may develop a pressure in the range of 6 to 8 psi, while the force of the spring 69 is in the range of about 4 psi. Thus, operation of pump 2 will overcome the force of spring 69 to move the valve to the closed position.

When engine operation is terminated and operation of the pump 2 is likewise terminated, the pressure in line 5 and passage 68 will be reduced and spring 69 will force the valve to the open position. This insures that under non-operating conditions the vent passage 71 will be open so that there will be no hazardous build-up of vapor pressure in tank 6 which could result if the vent passage was closed and the fuel was heated through ambient conditions.

As previously noted, operation of the engine will normally act to close the vent valve 73. If the engine idles or operates at idle speed for a sustained period of time, there is apt to be a build-up of temperature in the fuel and a resulting pressure increase in the fuel in the separating tank 6. The increase in pressure will tend to reduce the volume of vapor by raising the boiling point of the fuel. The increase in vapor pressure, acting in conjunction with the force of spring 69, will overcome the pressure in the lower chamber 66 to thereby move the valve 73 to the open position and vent the excess vapor pressure. Once the vapor pressure has decreased to a point where the combination of the vapor pressure and the spring force is less than the pressure of the fuel in passage 68, the valve 73 will again close.

The venting mechanism of the invention also has an advantage in the event that air is in the fuel system. For example, if a filter is replaced, causing air to be introduced into the fuel system, initial operation of the engine pump 2 will not supply sufficient pressure in chamber 66 and valve 73 will not close until the air is vented.

Figure 4:
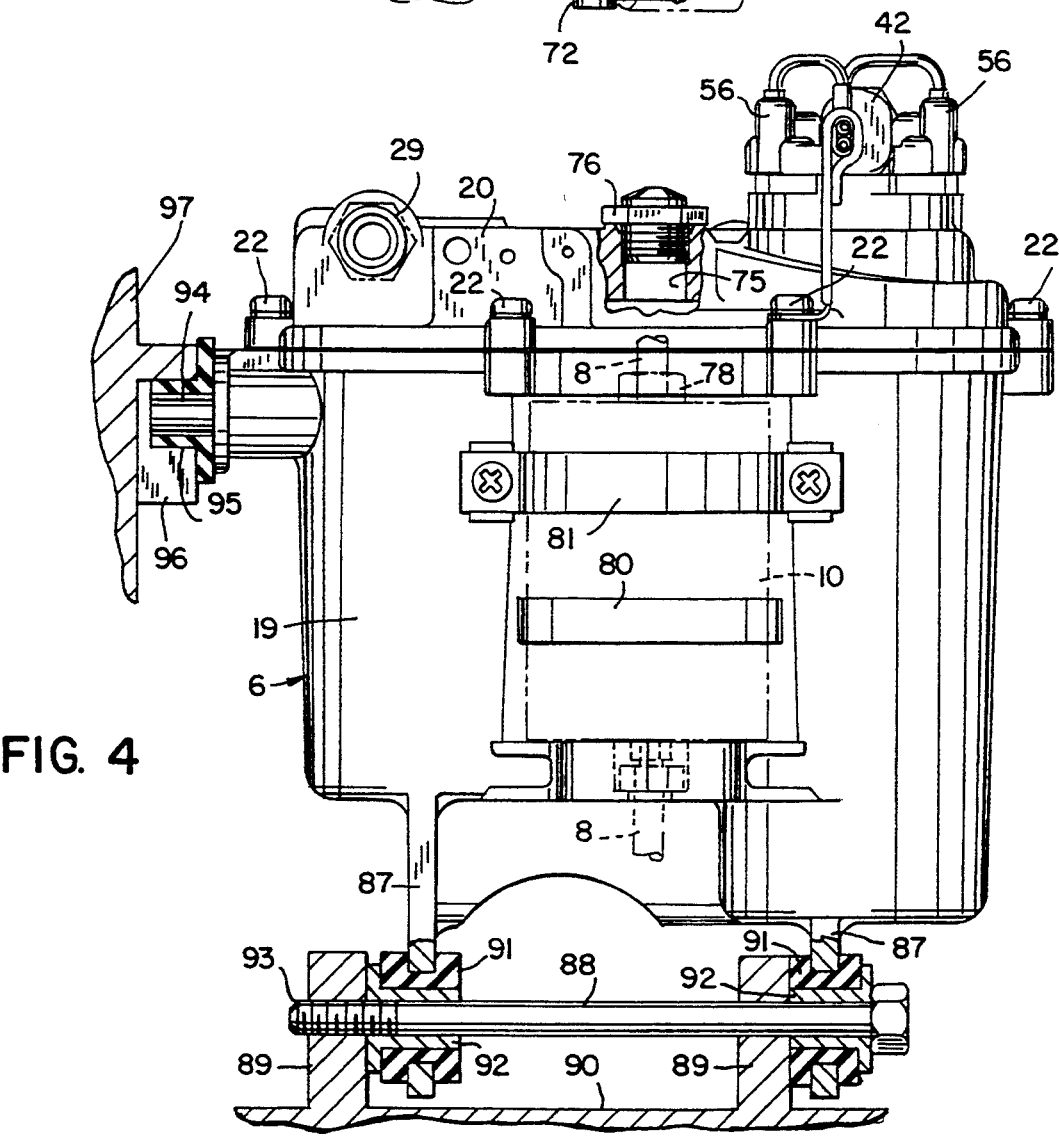
FIG. 4 is a side elevation of the separating tank and showing the connection to the plenum and manifold.
Figure 5:
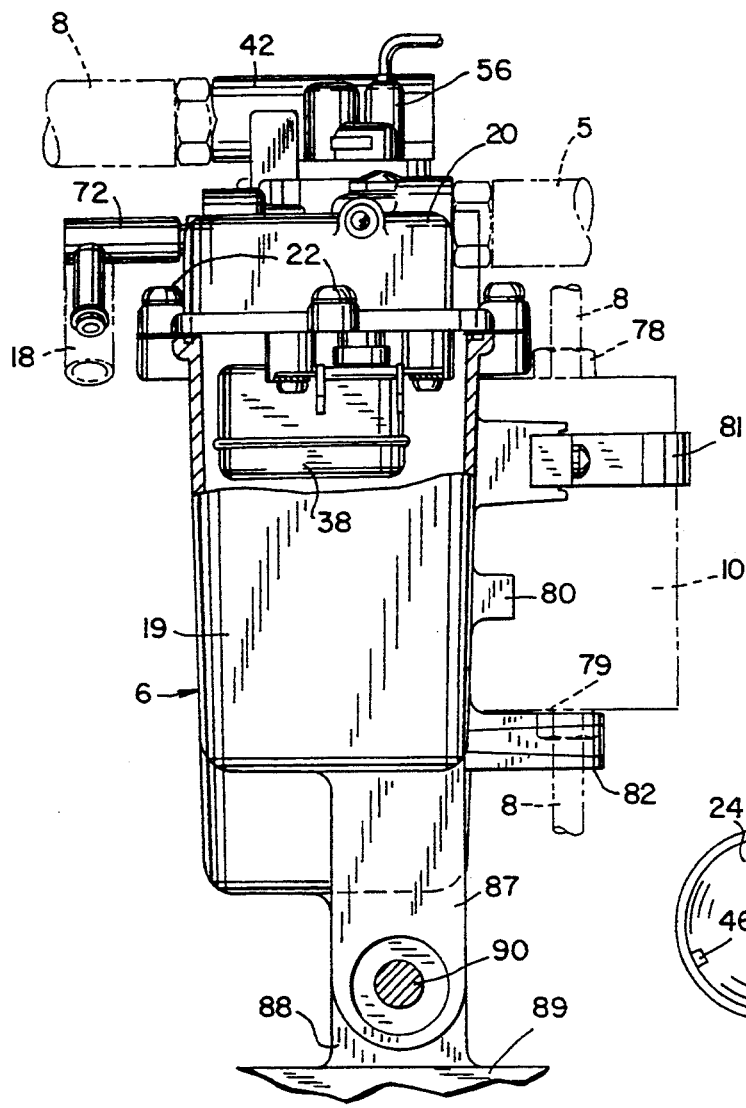
FIG. 5 is an end view of the separating tank with parts broken away in section.

As a feature of the invention, a priming port is provided in cover 20, and the priming port 75 is normally enclosed by a removable plug 76, as best seen in FIG. 4. At start-up of a new engine or in other situations where the fuel may be drained from the fuel system, the engine can be readily primed by feeding fuel through port 75 into the vapor separating tank 6.

As a further feature of the invention, the fuel filter 10 is mounted directly to the outer surface of the body 19 of the separating tank 6. Filter 10 is a conventional type having a cylindrical casing and fuel is introduced into the filter through line 8 which is connected to the upper end of the filter through a fuel line nut 78 and is discharged through line 8 which is connected to the lower end of the filter through a nut 79, as shown in FIG. 4. A curved cradle 80 extends outwardly from body 19 and serves to support the filter while a strap 81 extends across the filter and is connected to body 19 by screws.

It has been found that due to limited access it is difficult to connect and disconnect the lower nut 79 to the filter 10. To facilitate this attachment, the lower portion of body 19 is provided with an outwardly extending extension or projection 82 and the extension is formed with a pair of superimposed notches 83 and 84. The upper notch 83, as best shown in FIG. 3, is partially polygonal and is adapted to receive the hex nut 79 on the lower fuel line 8, while the lower notch 84 is semi-cylindrical and is adapted to receive the fuel line 8. With this construction, the fuel line nut 79 is initially engaged with the notch 83 and the fuel line 8 is inserted in notch 84. With the nut 79 trapped in the notch 83, the filter 10 can be connected to the fuel line by rotating the filter. After the filter 10 is connected to the lower fuel line nut 79, the upper fuel line nut 78 can then be attached to the filter in a conventional manner. Thus the invention enables the lower fuel line nut 79 to be readily connected and disconnected even though there is limited access.

The invention also includes a novel mechanism for mounting the vapor separating tank 6 to the engine. As shown in FIGS. 2 and 4, a pair of legs 87 extend downwardly from body 19 of the tank and the legs 87 are adapted to be connected by bolt 88 to a pair of lugs 89 which project upwardly from the manifold 90 of the engine. As seen in FIG. 4, legs 87 are provided with aligned openings and an outer resilient grommet 91 composed of rubber-like material and an inner flanged bushing 92 are mounted in each opening. Bolt 88 extends through the bushings 92 and through aligned holes in legs 89. One end 93 of bolt 88 is threaded in the hole in one of the legs 89, as illustrated in FIG. 4. The grommets 91 act to isolate the separating tank from engine heat and vibration.

As shown in FIG. 4, the upper end of body 19 is provided with an outwardly extending projection 94 and a flanged ring 95 of resilient material such as rubber, surrounds the projection. Projection 94 is adapted to be received within an inverted, U-shaped notch 96 formed in the outer surface of plenum 97 of the engine. The engagement of the projection 94 with the notch or recess 96 prevents the separating tank 6 from rotating about the axis of bolt 90, while the resilient ring 95 provides both thermal and vibrational isolation. As the recess 96 is open-ended, the plenum 97 can be removed upwardly and disengaged from the tank 6 without the necessity of disengaging the connection of the tank 6 to the manifold 89.

Various modes of carrying out the invention are contemplated as being within the scope of the following claims, particularly pointing out and distinctly claiming the subject matter which is regarded as the invention.

We claim:

1. A vapor separating assembly for a marine engine, comprising a tank, fuel inlet means for introducing liquid fuel into the tank, valve means connected to said fuel inlet means for opening and closing said fuel inlet means, liquid level control means responsive to the level of liquid in the tank for moving said valve means between the open and closed position, electric pumping means disposed within the tank and having an inlet located in the tank and an outlet communicating with a fuel rail assembly of an engine, said tank including a first section and a second section, said first section comprising a reservoir to contain liquid fuel and said second section comprising a pumping chamber to contain said pumping means, said tank further including an internal wall partially separating said reservoir and said pumping chamber, said tank having a sloping lower surface interconnecting said reservoir and said pumping chamber, fuel return conduit means connecting the fuel rail assembly with said tank for returning fuel to the tank, and vapor venting means connected to the upper end of the tank for venting vapor from the tank.

2. The assembly of claim 1, wherein said liquid level control means comprises a float operably connected to said valve means.

3. A vapor separating assembly for a marine engine, comprising a tank, fuel inlet conduit means for introducing liquid fuel into the tank, valve means connected to said fuel inlet conduit means for opening and closing said fuel inlet means, liquid level control means responsive to the level of liquid in the tank for moving said valve means between the open and closed position, electric pumping means disposed in the tank and having an inlet located in the tank and an outlet communicating with a fuel rail assembly of an engine, fuel return conduit means connecting the fuel rail assembly with said tank for returning fuel from the fuel rail assembly to the tank, vapor venting means connected to the upper end of the tank for venting vapor from the tank, a fuel filter connected to said fuel inlet conduit means, mounting means for mounting the fuel filter on an outside surface of said tank, said fuel filter comprising a container, said fuel inlet conduit means including a fuel line, a connector attached to said fuel line, means on said tank for engaging said connector and preventing rotation of said connector and enabling said container to be attached to said fuel line by rotation of said container, said means for preventing rotation comprising an extension extending outwardly from said tank and including a pair of open sided notches, a first of said notches being partially cylindrical to receive said fuel line and the second of said notches being partially polygonal in shape to receive said connector.

4. The assembly of claim 3, wherein said notches are vertically superimposed on said tank.

5. A vapor separating assembly for a marine engine, comprising a tank, fuel inlet conduit means for introducing liquid fuel into the tank, valve means connected to said fuel inlet conduit means for opening and closing said fuel inlet means, liquid level control means responsive to the level of liquid in the tank for moving said valve means between the open and closed position, electric pumping means disposed in the tank and having an inlet located in the tank and an outlet communicating with a fuel rail assembly of an engine, fuel return conduit means connecting the fuel rail assembly with said tank for returning fuel from the fuel rail assembly to the tank, and vapor venting means connected to the upper end of the tank for venting vapor from the tank, said vapor venting means comprising a venting conduit connected to the upper end of the tank, second valve means for opening and closing said vent conduit, and biasing means for biasing said second valve means to an open position.

6. The assembly of claim 5, and including means responsive to operation of the engine for overcoming the force of said biasing means to move said second valve means to the closed position.

7. A vapor separating assembly for a marine engine, comprising a tank, fuel inlet conduit means for introducing liquid fuel into the tank, valve means connected to said fuel inlet conduit means for opening and closing said fuel inlet means, liquid level control means responsive to the level of liquid in the tank for moving said valve means between the open and closed position, electric pumping means disposed in the tank and having an inlet located in the tank and an outlet communicating with a fuel rail assembly of an engine, fuel return conduit means connecting the fuel rail assembly with said tank for returning fuel from the fuel rail assembly to the tank, and vapor venting means connected to the upper end of the tank for venting vapor from the tank, said vapor venting means comprising a chamber, a flexible pressure responsive member dividing said chamber into a first chamber section and a second chamber section, first conduit means providing communication between the first chamber section and one of said fuel inlet conduit means and the atmosphere, second conduit means establishing communication between said second chamber section and the interior of said tank, a vent conduit communicating with said second chamber section, second valve means for opening and closing said vent conduit, and biasing means for biasing said second valve means to an open position.

8. The assembly of claim 7, wherein said pressure responsive member comprises a flexible diaphragm.

9. The assembly of claim 8, wherein said biasing means interconnects a fixed portion of said tank and said diaphragm.

10. The assembly of claim 8, wherein said second valve means is connected to said diaphragm.

11. The assembly of claim 8, wherein the force of the biasing means acting in conjunction with the vapor pressure in the tank act on one surface of said diaphragm and the fuel pressure at said inlet fuel means acts on the opposite surface of said diaphragm.

12. The assembly of claim 7, and including means for connecting said vent conduit with the fuel intake of the engine.

13. The assembly of claim 7, and including diaphragm pump means for pumping fuel from a storage tank to said fuel inlet means, said diaphragm pump means being constructed and arranged to develop a fuel pressure at said fuel inlet means in excess of the force developed by said biasing means so that operation of said diaphragm pumping means will move said second valve means to the closed position.

14. A vapor separating assembly for a marine engine, comprising a tank, fuel inlet conduit means for introducing liquid fuel into the tank, valve means connected to said fuel inlet conduit means for opening and closing said fuel inlet means, liquid level control means responsive to the level of liquid in the tank for moving said valve means between the open and closed position, electric pumping means disposed in the tank and having an inlet located in the tank and an outlet communicating with a fuel rail assembly of an engine, fuel return conduit means connecting the fuel rail assembly with said tank for returning fuel from the fuel rail assembly to the tank, vapor venting means connected to the upper end of the tank for venting vapor from the tank, and means connected to said fuel return conduit means for swirling the fuel being returned to the tank to aid in separating vapor from liquid fuel.

15. The assembly of claim 14, wherein the means for swirling comprises a return opening in said tank for receiving fuel being returned to said tank, said return opening being disposed generally tangentially to a wall of said tank.

16. The assembly of claim 15, and including a generally helical surface in said tank and aligned with said return opening, the returning fuel entering said return opening flowing on said helical surface.

17. In a fuel injection marine internal combustion engine, a fuel tank to contain fuel, a vapor separating tank, fuel inlet conduit means connecting said fuel tank with said vapor separating tank for introducing liquid fuel into said vapor separating tank, valve means connected to said fuel inlet conduit means for opening and closing said fuel inlet conduit means, liquid level control means responsive to the level of liquid in the vapor separating tank for moving said valve means between an open and closed position, a fuel rail including a plurality of fuel injectors each disposed to supply fuel to a cylinder of the engine, fuel supply conduit means connecting the vapor separating tank and the fuel rail for supplying fuel to the fuel rail, electric pumping means disposed within the vapor separating tank and having an inlet located in said vapor separating tank and an outlet communicating with said fuel supply conduit means, fuel return conduit means connecting the fuel rail with the vapor separating tank for returning excess fuel from the fuel rail to the vapor separating tank, and vapor venting means connected to the upper end of the vapor separating tank for venting vapor from the vapor separating tank.

18. The engine of claim 17 and including a priming port disposed in said vapor separating tank and adapted to receive fuel for priming purposes, and a removable plug enclosing said port.

19. The engine of claim 17, and including mounting means for mounting said vapor separating tank to the engine, said mounting means including a projection extending outwardly from said vapor separating tank and an inverted U-shaped boss on the engine and disposed to receive said projection, said mounting means also including a pair of spaced legs projecting outwardly from said vapor separating tank, at least one lug on said engine, a removable connector connecting said legs to said lug, and resilient means interposed between said legs and said lug to isolate the vapor separating tank from engine heat and vibration.

* * * * *